United States Patent

[11] 3,627,761

[72] Inventors Saul Lewis Neidleman
Lawrence Township;
Jerold Alan Last, Princeton; Samuel Cheng Pan, Metuchen; Joseph Edward Dolfini, N. Brunswick, all of N.J.
[21] Appl. No. 792,164
[22] Filed Jan. 17, 1969
[45] Patented Dec. 14, 1971
[73] Assignee E.R. Squibb & Sons, Inc.
New York, N.Y.

[54] PROCESS FOR THE PREPARATION OF CEPHALOSPORIN
11 Claims, No Drawings
[52] U.S. Cl. .................................................... 260/243
[51] Int. Cl. ................................................... C07d 99/24
[50] Field of Search ........................................ 260/243 C

[56] References Cited
UNITED STATES PATENTS
3,202,656 8/1965 Abraham et al. ............. 260/243 C
3,207,755 9/1965 Abraham et al. ............. 260/243 C

*Primary Examiner*—Nicholas S. Rizzo
*Attorneys*—Lawrence S. Levinson, Merle J. Smith and Theodore J. Criares ABSTRACT: A process comprising the treatment of a compound selected from the group consisting of:

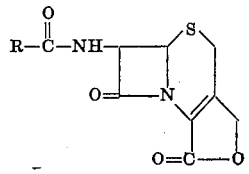

and

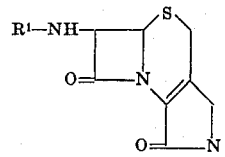

wherein R represents alkyl having up to seven carbon atoms, phenyl, X-substituted phenyl, naphthyl, X-substituted naphthyl, pyridyl, pyrryl, furyl, thienyl, pyridyl-lower alkyl, pyrrl-lower alkyl, furyl-lower alkyl, thienyl-lower alkyl,

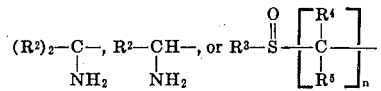

wherein $R^2$ represents alkyl having up to seven carbon atoms, phenyl, X-substituted phenyl, naphthyl, cyclohexadienyl (e.g., 1,4-cyclohexadienyl, 1,3-cyclohexadienyl, and 2,4-cyclohexadienyl), X-substituted naphthyl, pyridyl, pyrryl, furyl, thienyl, pyridyl-lower alkyl, pyrryl-lower alkyl, furyl-lower alkyl, or thienyl-lower alkyl; $R^3$ represents lower alkyl, monocyclic aryl, or monocyclic aryl-lower alkyl; $R^4$ and $R^5$ each represent hydrogen, lower alkyl, monocyclic aryl, or monocyclic aryl-lower alkyl; $n$ is 1, 2, or 3; and X represents lower alkyl, lower alkoxy, or halo; and $R^1$ represents triphenylmethyl, diphenylmethyl, or benzyl, said treatment comprising heating the above compounds to a temperature of about 25° C. to about 100° C. at a pH of about 6 to 11.5. Products prepared by means of the above reaction possess antibacterial activity against a large number of micro-organisms and are intermediates for the synthesis of related compounds (such as cephalothin, cephalexin, cephaloridine) which possess utility known to the art.

PROCESS FOR THE PREPARATION OF CEPHALOSPORIN

This invention relates to a novel process for the preparation of 3-deacetyl-N-substituted-7-aminocephalosporanic acids which have activity as antimicrobial agents.

One of the synthetic preparations of cephalosporins requires that an intermediate having the formula A be synthesized.

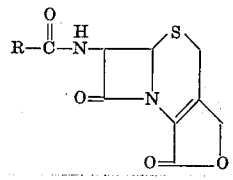

A

Up to the present no satisfactory method has been available to open the lactone ring of such compounds, since simultaneous destruction of the β-lactam ring occurs [cf. *Topics in Pharmaceutical Sciences*, *1*, 33–51, Interscience Publishers (1968)]. In the absence of a suitable process for opening the lactone ring, therefore, efforts at the development of a total synthesis of cephalosporins by this relatively simple route have been uneconomical.

It has now been discovered that the lactone ring may be opened in satisfactory yield by the process of the present invention.

It is, accordingly, an object of the present invention to prepare compounds having the formula

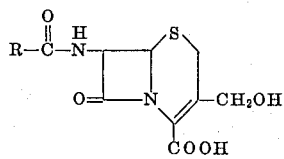 I or

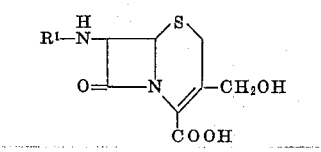 II wherein R represents alkyl having up to seven carbon atoms, phenyl, X-substituted phenyl, naphthyl, X-substituted naphthyl, pyridyl, pyrryl, furyl, thienyl, pyridyl-lower alkyl, pyrryl-lower alkyl, furyl-lower alkyl-thienyl-lower alkyl,

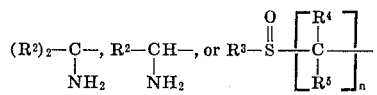

wherein $R^2$ represents alkyl having up to five carbon atoms, phenyl, X-substituted phenyl, naphthyl, cyclohexadienyl (e.g., 1,4-, 1,2-, and 2,4-cyclohexadienyl), X-substituted naphthyl, pyridyl, pyrryl, furyl, thienyl, pyridyl-lower alkyl, pyrryl-lower alkyl, furyl-lower alkyl, and thienyl-lower alkyl; $R^3$ represents lower alkyl, monocyclic aryl, or monocyclic aryl-lower alkyl; $R^4$ and $R^5$ each represent hydrogen, lower alkyl, monocyclic aryl, or monocyclic aryl-lower alkyl; n is 1, 2, or 3; and X represents lower alkyl, lower alkoxy, or halo; and $R^1$ represents triphenylmethyl, diphenylmethyl, or benzyl.

All four halogens are contemplated. The term "lower alkyl" as employed herein includes both straight and branched chain radicals of less than eight carbon atoms. Lower alkyl groups are exemplified by methyl, ethyl, propyl, isopropyl, n-butyl, 1,1-dimethylbutyl and n-hexyl.

By monocyclic aryl is meant phenyl and substituted phenyl radicals such as lower alkyl phenyl, as exemplified by o-, m-, or p-tolyl and ethylphenyl, di(lower alkyl)-phenyl as exemplified by p-xylyl, lower alkoxyphenyl as exemplified by methoxyphenyl and propoxyphenyl and halophenyl as exemplified by chlorophenyl, bromophenyl, iodophenyl and fluorophenyl.

Further contemplated within this invention are the preparation of salts of the above acids with various pharmaceutically acceptable cations as is well known in the art.

As pharmaceutically acceptable cations may be mentioned metallic cations such as sodium, potassium, calcium and aluminum and organic amine cations such as trialkylamines, e.g., triethylamine, procaine, dibenzylamine, N-benzyl-β-phenethylamine, 1-ephenamine, N,N'-dibenzylethylenediamine, N-(lower)alkylpiperidines, e.g., N-ethylpiperidine, quaternary ammonium ions (e.g., tetramethylammonium, tetraethylammonium, pyridinium, and the like), and other amines which have been used to form salts with benzylpenicillin.

Compounds prepared by means of the process of this invention (i.e., the compounds of Formulas I and II) are physiologically active substances which have a high degree of antibacterial activity against a large number of micro-organisms, including Gram positive and Gram negative micro-organisms such as *Staphylococcus aureus*, *Escherichia coli*, *Klebsiella pneumoniae*, *Aerobacter aerogenes*, and *Shigella sonnei*.

For these purposes, they may be administered orally or parenterally in such form as tablets, capsules, injectables, or the like, by incorporating the appropriate dosage of the compound with carriers according to standard pharmaceutical practice. Dosages for various mammillary species (e.g., rats, dogs, cats, cattle, horses, and so forth) would be from about 0.01 to about 1.5 g./kg. daily, administered once to several times a day.

In addition, the compounds of this invention are useful as supplements to animal feeds, such as for poultry, cattle, and swine (particularly weanling pigs) as an aid in increasing growth rate, improved feed efficiency and in the suppression of infections during periods of stress, such as weaning, castration, vaccination, high temperature and moving. For such purposes the concentration in the animal feed would range from about 10 to 400 grams per ton, optimally about 200 grams per ton.

Further, the compounds of this invention, in aqueous solution or suspension, may be employed as disinfectants against various staphylococci. For this purpose, they are dissolved or suspended in water, preferably also containing a detergent, at a concentration of about 0.5 percent to about 10 percent and may be used as washes to disinfect walls, floors, tables, and the like.

The process of this invention comprises heating a compound of the formulas

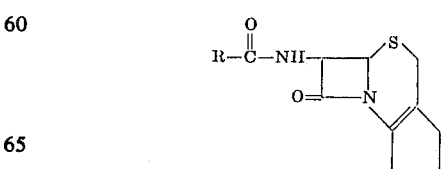

III and

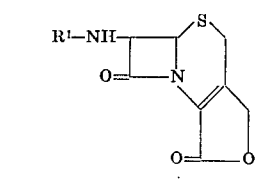

(IV)

wherein R and R¹ are as set forth hereinabove, at a pH of about 6 to 11.5, to a temperature of between about 25° C. and 100° C. Generally the reaction is complete in from 0.5 minutes to 16 hours.

It has been observed empirically, although no explanatory theory can be advanced as yet, that the process of this invention does not proceed satisfactorily in the presence of hydrogen-bonding highly nucleophilic heteroatom functions such as amino, sulfhydryl, phenolic hydroxyl, and the like. Accordingly, buffers containing functional groups which possess these properties under the reaction conditions employed (temperature, pressure, solvent, and so forth) should preferably be excluded from the mixture.

Operation in the above-stated pH range may be achieved, for instance, by treating in the presence of aqueous solutions of hydroxides of alkali metals, or alkaline earth metals, such as magnesium, calcium, lithium, sodium, potassium, or a buffer solution comprising any of various salts of carboxylic or mineral acids usually employed for that purpose, as is well known in the art. For example, such materials as potassium phosphate, mixtures of boric acid and borax, or of sodium carbonate and sodium bicarbonate may be employed in order to maintain the desired pH of the reaction mixture.

Various solvents may be employed in the process of this invention to assist in the solubilization of the lactones. The use of dimethylsulfoxide exemplifies a preferred embodiment of the invention. However, any solvent which will solubilize the lactones of Formulas III and IV may be employed. Among such solvents may be mentioned dimethylformamide, ethanol, isopropanol, acetone, acetonitrile, tetrahydrofuran, 1,2-dimethoxyethane, ethylene glycol, and dioxane. Other variations in solvent will readily occur to those skilled in the art.

Generally speaking, the reaction will take place throughout the temperature and pH ranges specified above. However, optimization of yield requires that the temperature be increased as the pH is decreased, whereas at a higher pH a lower temperature may be employed. It is preferred, for instance, when operating in a pH range of about 6 to 8.9, to employ reaction temperatures of about 50° to 100° C. for a time of about 0.5 to 5 minutes, and when operating in a pH range of about 8.9 to 11.5, to employ reaction temperatures of about 25° to 50° C. for a time of about 0.5 to 10 minutes.

As stated above the compounds of the instant invention may be utilized as intermediates for the preparation of compounds such as cephalothin, cephalexin and derivatives thereof.

Having obtained a compound of the Formula V

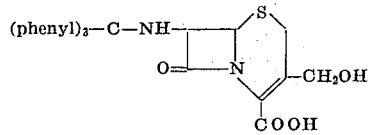

the following sequence of reactions may be carried out to form cephalothin. Compound V is reacted with benzoyl chloride either alone or in the presence of a base (e.g., sodium hydroxide to yield a benzoylated Compound VI

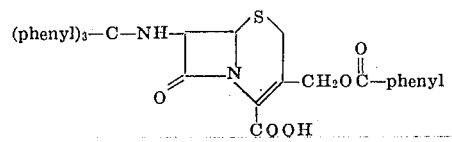

VI

In this reaction the trityl group acts as a blocking moiety and prevents the acylation of the secondary amino group. The trityl protecting group is then removed by treating Compound VI with an aqueous acid, e.g., acetic acid and thereafter N-acylated with 2-thiophene-acetylchloride to yield the compound of Formula VII

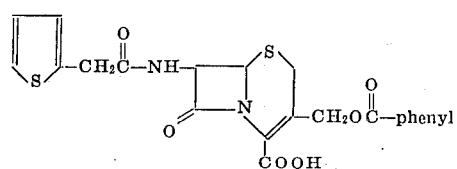

VII

By reacting this compound with pyridine acetate at a pH of from about 5 to 7, cephaloridine of Formula VIII is obtained

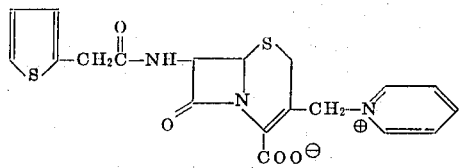

VIII which may be converted to cephalothin by treatment with acetate/acetic acid buffer at a pH of from about 6 to about 8.

Further, Compounds V or VI may be subjected to hydrogenolysis to yield 3-deacetoxy-7-amino cephalosporanic acid, Compound IX

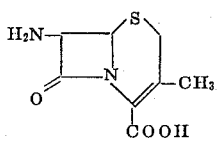

IX

This compound is a well-recognized useful precursor in the preparation of cephalexin derivatives.

Additionally, the trityl Compound V may be utilized as an intermediate in the preparation of 7-acylamido cephalosporanic acid by the following sequence of reactions

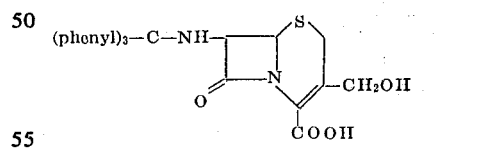

V diazomethane
diphenyl diazomethane
↓

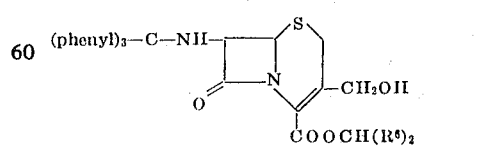

acetic anhydride/pyridine
↓

X

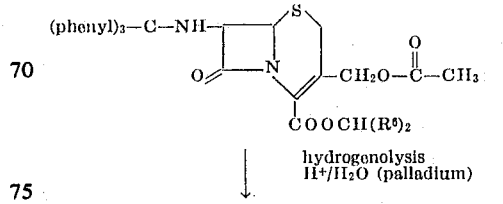

hydrogenolysis
H⁺/H₂O (palladium)
↓

XI

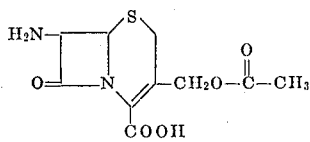

XII wherein $R^6$ is hydrogen or phenyl.

The following examples illustrate the invention

EXAMPLE 1

One mg. of 3-deacetyl-7-[2-(2-thienyl)-acetamido]-cephalosporanic acid lactone is dissolved in 0.2 ml. dimethylsulfoxide and added to 0.8 ml. 0.25 M potassium phosphate buffer, pH 8.0. The reaction mixture is placed in a water bath at 100° C. for 5 minutes and then cooled to room temperature in an ice bath. The sample is spotted at 20 μl. on Whatman No. 1 paper and chromatographed using ethyl acetate:n-butanol:$H_2O$ (2:5:1) as the developing solvent. The chromatogram is air dried and bioautographed against *Staphylococcus aureus* 209P overnight. A zone of growth inhibition corresponding to that of authentic 3-deacetyl-7-[2-(2-thienyl)-acetamido]-cephalosporanic acid is obtained (Rf=0.03). There is no residual 3-deacetyl- 7-[2-(2-thienyl)-acetamido]-cephalosporanic acid lactone. In an unheated sample (25° C.), identically constituted, only 3-decetyl-7-[2(2-thienyl)-acetamido]-cephalosporanic acid lactone is noted (Rf=0.86). An estimate of the yield of 3-deacetyl-7-[2-(2-thienyl)-acetamido]-cephalosporanic acid based on a calibration curve of authentic material gives a result of 10 percent.

EXAMPLE 2

The procedure of example 1 is followed except 0.25 M potassium phosphate buffer, pH 7.5, is used in place of 0.25 M potassium phosphate buffer, pH 8.0. A yield estimate as in example 1 gives a result of 10–20 percent of 3-deacetyl-7-[2-(2-thienyl)-acetamido]-cephalosporanic acid.

EXAMPLE 3

The procedure of example 1 is followed, except 0.25 M potassium phosphate buffer, pH 7.0, is used in place of 0.25 M potassium phosphate buffer, pH 8.0 to obtain 3-deacetyl-7-[2-(2-thienyl)-acetamido]-cephalosporanic acid. In this example, some residual 3-deacetyl-7-[2-(2-thienyl)-acetamido]-cephalosporanic acid lactone is noted.

EXAMPLE 4

The procedure of example 1 is followed except 0.25 M potassium phosphate, pH 6.5, is used in place of 0.25 M potassium phosphate, pH 8.0 to obtain 3-deacetyl-7-[2-thienyl)-acetamido]-cephalosporanic acid. In this example, some residual 3-deacetyl-7-[2-(2-thienyl)-acetamido]-cephalosporanic acid lactone is noted.

EXAMPLE 5

The procedure of example 1 is followed except 0.25 M potassium phosphate, pH 6.0, is used in place of 0.25 M potassium phosphate, pH 8.0, to obtain 3-deacetyl-7-[2-(2-thienyl)-acetamido]-cephalosporanic acid. In this example, some residual 3-deacetyl-7-[2-(2-thienyl)-acetamido]-cephalosporanic acid lactone is noted.

EXAMPLE 6

The procedure of example 2 is followed except that a temperature of 50° C. instead of 100° C. is employed to obtain 3-deacetyl-7-[2-(2-thienyl)-acetamido]-cephalosporanic acid. In this example, some residual 3-deacetyl-7-[2-(2-thienyl)-acetamido]-cephalosporanic acid lactone is noted.

EXAMPLE 7

The procedure of example 2 is followed except that a temperature of 75° C. instead of 100° C. is employed to obtain 3-deacetyl-7-[2-(2-thienyl)-acetamido]-cephalosporanic acid. In this example, some residual 3-deacetyl-7-[2-(2-thienyl)-acetamido]-cephalosporanic acid lactone is noted.

EXAMPLE 8

The procedure of example 1 is followed except 0.25 M boric acid-borax buffer, pH 8.9, is used instead of 0.25 M potassium phosphate buffer, pH 8.0, and heating is for 2 minutes to obtain 3-deacetyl-7-[2-(2-thienyl)-acetamido]-cephalosporanic acid. An unheated sample (25° C.) also shows 3-deacetyl-7-[2-(2-thienyl)-acetamido]-cephalosporanic acid with some residual 3-deacetyl-7-[2-(2-thienyl)-acetamido]-cephalosporanic acid lactone after a 10-minute incubation period.

EXAMPLE 9

The procedure of example 1 is followed except 0.25 M boric acid-borax buffer, pH 8.0, is used instead of 0.25 M potassium phosphate, pH 8.0, and heating is for 2 minutes to obtain 3-deacetyl-7-[2-(2-thienyl)-acetamido]-cephalosporanic acid.

EXAMPLE 10

The procedure of example 1 is followed except 0.25 M boric acid-borax buffer, pH 7.0, is used instead of 0.25 M potassium phosphate buffer, pH 8.0, and heating is for 2 minutes to obtain 3-deacetyl-7-[2-(2-thienyl)-acetamido]-cephalosporanic acid. In this example some residual 3-deacetyl-7-[2-(2-thienyl)-acetamido]-cephalosporanic acid lactone is noted.

EXAMPLE 11

The procedure of example 1 is followed except 0.25 M sodium bicarbonate-sodium carbonate buffer, pH 9.0, is used instead of 0.25 M potassium phosphate buffer, pH 8.0, and heating is for 2 minutes to obtain 3-deacetyl-7-[2-(2-thienyl)-acetamido]-cephalosporanic acid. An unheated sample (25° C.) also shows 3-deacetyl-7-[2-(2-thienyl)-acetamido]-cephalosporanic acid with some residual 3-deacetyl-7-[2-(2-thienyl)-acetamido]-cephalosporanic acid lactone after a 10-minute incubation period.

EXAMPLE 12

The procedure of example 1 is followed except 0.25 M sodium bicarbonate-sodium carbonate buffer, pH 10.0, is used instead of 0.25 M potassium phosphate buffer, pH 8.0, and the sample is unheated (25° C.) with a 10-minute incubation period to obtain 3-deacetyl-7-[2-(2-thienyl)-acetamido]-cephalosporanic acid.

EXAMPLE 13

The procedure of example 12 is followed except 0.25 M sodium bicarbonate-sodium carbonate buffer, pH 10.8, is used instead of 0.25 M sodium bicarbonate-sodium carbonate buffer, pH 10.0, to obtain 3-deacetyl-7-[2-(2-thienyl)-acetamido]-cephalosporanic acid.

EXAMPLE 14

The procedure of example 1 is followed except dilute potassium hydroxide (pH 11.5) is used instead of 0.25 M potassium phosphate buffer, pH 8.0, and the sample is unheated (25° C.) with a 2-minute incubation period to obtain 3-deacetyl-7-[2-(2-thienyl)-acetamido]-cephalosporanic acid. A yield estimate, as in example 1, gives a result of 10 percent.

EXAMPLE 15

One mg. of 3-deacetyl-7-[2-(2-thienyl)-acetamido]-cephalosporanic acid lactone is dissolved in 0.2 ml. dimethylsulfoxide and added to 0.8 ml. 0.25 M potassium phosphate buffer, pH 8.0. A 10 μl. aliquot is spotted on Whatman No. 1 paper and the remaining reaction mixture is immersed in a water bath at 100° C. Ten μl. aliquots are removed and spotted on the sheet of Whatman No. 1 paper at 1/2, 1, 2, 5, 10 and 30 minutes. The chromatogram is developed with ethyl acetate:n-butanol:$H_2O$ (2:5:1) and after air-drying is bioautographed against Staphylococcus aureus 209P overnight. The growth inhibitory zone due to 3-deacetyl-7-[2-(2-thienyl)-acetamide]-cephalosporanic acid is seen in all heated aliquots (Rf=0.03) with the maximum zone in the 1-minute sample.

EXAMPLE 16

The procedure of example 15 is followed except 0.25 M potassium phosphate buffer, pH 7.5, is used instead of 0.25 M potassium phosphate buffer, pH 8.0. The maximum zone of growth inhibition is in the 2-minute aliquot.

EXAMPLE 17

The procedure of example 15 is followed except 0.25 M potassium phosphate buffer, pH 7.0, is used instead of 0.25 M potassium phosphate buffer, pH 8.0. The maximum zone of growth inhibition is in the 5-minute aliquot.

EXAMPLE 18

The procedure of example 15 is followed except dilute potassium hydroxide (pH 11.5) is used instead of 0.25 M potassium phosphate buffer, pH 8.0, and the sample is unheated (25° C.). The maximum zone of growth inhibition is achieved in the ½-minute aliquot; the product was detectable in these solutions for as long as 16 hours.

EXAMPLE 19

Following the procedure of example 1, but substituting 3-deacetyl-7-(benzamido)-cephalosporanic acid lactone, there is obtained 3-deacetyl-7-(benzamido)-cephalosporanic acid.

EXAMPLE 20

Following the procedure of example 1, but substituting 3-deacetyl-7-[2-(1-naphthyl)-acetamido]-cephalosporanic acid lactone, there is obtained 3-deacetyl-7-[2-(1-naphthyl)-acetamido]-cephalosporanic acid.

EXAMPLE 21

Following the procedure of example 1, but substituting 3-deacetyl-7-[2-(2-pyridyl)-acetamido]-cephalosporanic acid lactone, there is obtained 3-deacetyl-7-[2-(2-pyridyl)-acetamido]-cephalosporanic acid.

EXAMPLE 22

Following the procedure of example 1, but substituting 3-deacetyl-7-[2-(2-furyl)-acetamido]-cephalosporanic acid lactone, there is obtained 3-deacetyl-7-[2-(2-furyl)-acetamido]-cephalosporanic acid.

EXAMPLE 23

Following the procedure of example 1, but substituting 3-deacetyl-7-(2-aminoacetamido)-cephalosporanic acid lactone, there is obtained 3-deacetyl-7-(2-aminoacetamido)-cephalosporanic acid.

EXAMPLE 24

Following the procedure of example 1, but substituting 3-deacetyl-7-(2-aminopropionamido)-cephalosporanic acid lactone, there is obtained 3-deacetyl-7-(2-aminopropionamido)-cephalosporanic acid.

EXAMPLE 25

Following the procedure of example 1, but substituting 3-deacetyl-7-(2-amino-2-phenylacetamido)-cephalosporanic acid lactone, there is obtained 3-deacetyl-7-(2-amino-2-phenylacetamido)-cephalosporanic acid.

EXAMPLE 26

Following the procedure of example 1, but substituting 3-deacetyl-7-[2-(2-pyrryl)-acetamido]-cephalosporanic acid lactone, there is obtained 3-deacetyl-7-[2-(2-pyrryl)-acetamido]-cephalosporanic acid.

EXAMPLE 27

Following the procedure of example 1, but substituting 3-deacetyl-7-[3-(methylsulfinyl)-propionamido]-cephalosporanic acid lactone, there is obtained 3-deacetyl-7-[3-(methylsulfinyl)-propionamido]-cephalosporanic acid.

EXAMPLE 28

Following the procedure of example 1, but substituting 3-deacetyl-7-[3-(phenylsulfinyl)-propionamido]-cephalosporanic acid lactone, there is obtained 3-deacetyl-7-[3-(phenylsulfinyl)-propionamido]-cephalosporanic acid.

EXAMPLE 29

Following the procedure of example 1, but substituting 3-deacetyl-7-[3-benzyl-3-methyl-4-(benzylsulfinyl)-butyramido]-cephalosporanic acid lactone, there is obtained 3-deacetyl-7-[3-benzyl-3-methyl-4-(benzylsulfinyl)-butyramido]-cephalosporanic acid.

EXAMPLE 30

Following the procedure of example 1, but substituting 3-deacetyl-7-benzylaminocephalosporanic acid lactone, there is obtained 3-deacetyl-7-benzylaminocephalosporanic acid.

EXAMPLE 31

Following the procedure of example 1, but substituting 3-deacetyl-7-diphenylmethyl aminocephalosporanic acid lactone, there is obtained 3-deacetyl-7-diphenylmethyl aminocephalosporanic acid.

EXAMPLE 32

Following the procedure of example 1, but substituting 3-deacetyl-7-triphenylmethyl aminocephalosporanic acid lactone, there is obtained 3-deacetyl-7-triphenylmethyl aminocephalosporanic acid.

EXAMPLE 33

Conversion of 3-deacetyl-7-[2-(2-thienyl)-acetamido]-cephalosporanic acid lactone to Methyl 7-[2-(2-thienyl)-acetamido]-cephalosporanate To a solution of 150 mg. of 3-deacetyl-7-[2-(2-thienyl)-acetamido]-cephalosporanic acid lactone in 30 ml. of dimethylsulfoxide is added 120 ml. of ice-chilled 0.01 N KOH (see example 18). After allowing the mixture to stand at room temperature for exactly 2 minutes, 7.5 ml. of 0.2 M acetic acid is added to stop the reaction. Paper chromatography (see example 1) of the resulting solution shows the presence of 3-deacetyl-7-[2-(2-thienyl)-acetamido]-cephalosporanic acid by virtue of its UV-absorption as well as its antibacterial activity.

The solution which has a pH of 5.0 is extracted three times with 300-ml. portions of chloroform to remove the DMSO. To the aqueous phase is added 80 g. of $(NH_4)_2SO_4$ and the resulting solution is extracted twice with 180-ml. portions of a solvent mixture consisting of 5 vol. of ethyl acetate, 5 vol. of acetone and 1 vol. of water. Paper chromatography (see example 1) shows that the 3-deacetyl-7-[2-(2-thienyl)- acetamido]-cephalosporanic acid is now extracted in the solvent phase. The combined solvent phase is evaporated under vacuum to a syrup (residual DMSO). Evaporation is repeated twice at a bath temperature of 60° C. after the addition of 25 ml. absolute ethanol each time to remove the remaining water. The volume of the syrup amounts to approximately 9 ml.

This is dissolved in 40 ml. of ethyl acetate which has been dried over anhydrous $Na_2SO_4$. To this solution is added an excess of diazomethane as its solution in ether. After allowing the mixture to stand at room temperature for 2 minutes, the excess diazomethane is removed by the addition of 0.5 ml. of glacial acetic acid. The resulting solution is washed twice with 25-ml. portions of water to remove the DMSO. Paper chromatography shows that the ethyl acetate solution now contains methyl 3-deacetyl-7-[2-(2-thienyl)-acetamido]-cephalosporanate.

The ethyl acetate solution is evaporated under vacuum to dryness. The residue is taken up in 14 ml. of pyridine and 7 ml. of acetic anhydride is added. After allowing the mixture to stand at room temperature for a period of about 15 hours, 5 ml. of methanol and 25 ml. of chloroform are added in the order given. The resulting solution is partitioned with 50 ml. of 3 N HCl and is then washed twice with 25-ml. portions of water. Thin layer chromatography (see below) shows that the chloroform phase now contains methyl 7-[2-(2-thienyl)-acetamido]-cephalosporanate.

The chloroform solution is concentrated under vacuum to a small volume and chromatographed on 12 8×8-inch cellulose plates in the following manner. The precoated cellulose plates (Analtech) are irrigated with a mixture of 1 volume of propylene glycol and 2.3 volumes of methanol in the same manner as in the development of an ascending chromatogram. When the solvent front reaches the upper edge of the plates, they are air-dried for 30–60 minutes. The sample is applied as a streak three-fourths inch from the lower edge of the plates. An ascending chromatogram is then developed with propylene glycol saturated toluene as the mobile solvent. The band recognized as the desired methyl 7-[2-(2-thienyl)-acetamido]-cephalosporanate by virtue of the UV-absorption and its Rf (0.6) is eluted with a 1:1 methanol-chloroform mixture. The eluate is partitioned between equal volumes of chloroform and 50 percent (by volume) methanol in water. The chloroform phase is washed twice with equal volumes of 25 percent methanol in water and then dried over anhydrous $Na_2SO_4$. On evaporating the chloroform solution to dryness under vacuum, 9 mg. of crude crystalline methyl 7-[2-(2-thienyl)-acetamido]-cephalosporanate is obtained. It is recrystallized from methanol to give the pure product, having an IR spectrum identical to that of authentic methyl 7-[2-(2-thienyl)-acetamido]-cephalosporanate.

EXAMPLE 34

Diphenylmethyl ester of 7-tritylamino-3-(hydroxymethyl)-ceph-3-em-4-carboxylic acid To a solution of 454 mg. of 7-tritylamino-3-(hydroxymethyl)-ceph-3-em-4-carboxylic acid lactone in 50 ml. acetone at 20±5° C. is added 333 ml. of 0.003 N aqueous potassium hydroxide during 20 (±5) minute interval. After an elapsed time of 30 minutes, the reaction mixture is treated with an aqueous solution of p-toluene-sulfonic acid at <5° C. until the pH of 5.0 is attained. The resulting mixture is then evaporated at reduced pressure at <5° C. The residual hydroxy acid is taken up in ice-cold dimethyl formamide and treated with approximately 1 ml. of a one molar solution [cf. Aboderin, Delpiene, and Fruton, J. Am. Chem. Soc., 87, 5469 (1965)] of diphenyl-diazomethane in dimethylformamide until a slight color of excess diazocompound persists. The excess reagent is destroyed by adding a small amount of acetic acid. (The unstable hydroxy ester may be conveniently used as this solution.)

EXAMPLE 35

7-Aminocephalosporanic acid

The solution from example 34, at 0° C., is treated with 1 g. of acetic anhydride and 1 ml. pyridine and allowed to warm to room temperature for 15 hours. The reaction mixture is then poured over ice and the pH of the mixture adjusted to 7.5. The system is extracted with ether to isolate the crude product. The ethereal extract is washed twice with cold 1 percent aqueous sodium bicarbonate solution, then with saturated aqueous sodium chloride solution and finally dried and evaporated at <10° C. to dryness by reduced pressure.

Catalytic hydrogenolysis of the material may be conducted in an ethyl acetate (or methanol) solution (ca. 50 ml.) over 1.0 g. of 10 percent palladium on carbon catalyst at room temperature for 1 to 1.5 hours. The hydrogenated mixture is treated with excess ice-cold 1 percent aqueous sodium bicarbonate solution (ca. 50 ml.); the aqueous layer is washed once with ether, then diluted with 25 ml. glacial acetic acid. After stirring the mixture for 1 hour at room temperature, the solution is evaporated at reduced pressure. Trituration of the residue with ether removes the triphenylcarbinol byproduct and deposits crude 7-aminocephalosporanic acid.

EXAMPLE 35

3-Deacetoxy-7-aminocephalosporanic acid

When the catalytic hydrogenolysis in example 34 is allowed to proceed in methanol solution until nearly 3 molecular equivalents of hydrogen are absorbed (at 1 to 4 atmospheric pressure), the product, after working up as in example 34, consists mainly of 3-deacetoxy-7-aminocephalosporanic acid.

EXAMPLE 36

Preparation of 3-(benzoyloxymethyl)-7-aminoceph-3-em-4-carboxylic acid

To a solution of 454 mg. (1.0 mmole) 7-tritylamino-3-(hydroxymethyl)-ceph-3-em-4-carboxylic acid lactone in 50 ml. acetone at 20° C. is added 333 ml. 0.003 N aqueous potassium hydroxide as in example 34. After 30 minutes, the rapidly stirred solution is treated with 164 mg. (1.3 mmole) benzoyl chloride at 0° C. with the slow addition of 0.03 N aqueous potassium hydroxide over a 15-minute interval to maintain pH 8.0±0.5. After an additional 30 minutes at 0° C., the solution is acidified to pH 3 with formic acid and stirred for 25 minutes, after which time the pH is adjusted to 4.6 with dilute aqueous potassium hydroxide. The desired product is separated by filtration. Trituration of the residue with ether leaves the hydrochloride salt of the product.

EXAMPLE 37

Benzyl ester of 7-tritylamino-3-(hydroxymethyl)-ceph-3-em-4-carboxylic acid

Substitution of phenyldiazomethane in lieu of diphenyldiazomethane in example 34 produces the desired product.

EXAMPLE 38

Benzyl ester of 7-aminocephalosporanic acid

A 10 percent solution of the crude benzyl ester in the preceding example in pyridine is treated with a 10-fold excess of acetic anhydride at room temperature. The reaction mixture is evaporated at <10° C. at reduced pressure and the resulting residue stirred with excess aqueous 1 percent hydrochloric acid for one-half hour at ambient temperature. The result is evaporated under reduced pressure, yielding the desired product.

EXAMPLE 39

Bis-(p-methoxyphenyl)methyl ester of 7-tritylamino 3-hydroxymethylceph-3-em-4-carboxylic acid Following the procedure of example 34, but utilizing bis-(p-methoxyphenyl)diazomethane in lieu of diphenyldiazomethane, the desired product is recovered.

EXAMPLE 40

7-Aminocephalosporanic acid

The product recovered by utilizing the product of example 39 and treating it in accordance with the procedure of example 35 is treated with 1:1 acetic acid-water solution for about 30 minutes at ambient temperature with rapid stirring; the solid formed is removed by filtration and triturated with ether. The final solid residue is 7-aminocephalosporanic acid.

EXAMPLE 41

Deacetoxy-7-aminocephalosporanic acid

To a solution of 454 mg. 7-tritylamino-3-(hydroxymethyl)-ceph-3-em-4-carboxylic acid lactone in 50 ml. acetone at 20° C. is added 333 ml. 0.003 N aqueous potassium hydroxide as in example 34. After about 30 minutes the solution is concentrated to about 30 ml. at reduced pressure at about 20° C. The resulting solution is chilled to about 5° C. and treated, with very rapid stirring, with 164 mg. benzoyl chloride for 45 minutes; during the reaction, dilute potassium hydroxide is added as needed to maintain pH 8.0±0.5. The reaction mixture is then treated with 1 gram Norite (activated carbon) and filtered. One gram of 10 percent palladium on carbon is added and the suspension hydrogenated for 1.5 hours at 3 atmospheres pressure. The reaction mixture is readjusted to pH of about 7.5 to 8 if necessary and filtered. The pH of the filtrate is adjusted to 4.6 and chilled to precipitate the product. Trituration with several small portions of water leaves the product as a powder.

What is claimed is:

1. A process for preparing compounds having the formulas:

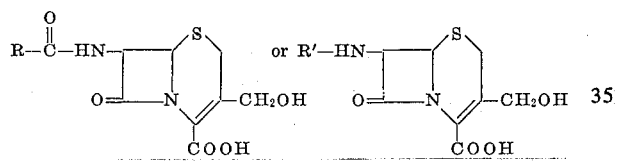

which comprises treating a compound selected from the group consisting of:

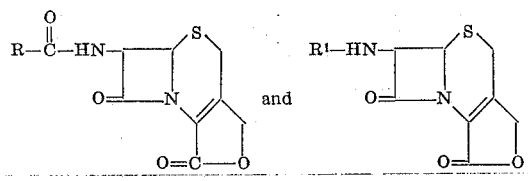

with a solution having a pH of from about 6 to about 11.5, wherein R is a member selected from the group consisting of alkyl having up to seven carbon atoms, phenyl, X-substituted phenyl, naphthyl, X-substituted naphthyl, pyrridyl, pyrryl, furyl, thienyl, pyrridyl-lower alkyl, pyrryl-lower alkyl, furyl-lower alkyl, thienyl-lower alkyl,

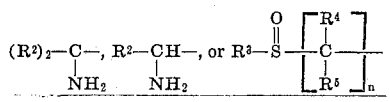

wherein $R^2$ is a member selected from the group consisting of alkyl having up to seven carbon atoms, phenyl, X-substituted phenyl, naphthyl, X-substituted naphthyl, pyrridyl, pyrryl, furyl, thienyl, pyrridyl-lower alkyl, pyrryl-lower alkyl, furyl-lower alkyl, and thienyl-lower alkyl; $R^3$ is a member selected from the group consisting of lower alkyl, monocyclic aryl, and monocyclic aryl-lower alkyl; $R^4$ and $R^5$ each are selected from the group consisting of hydrogen, lower alkyl, monocyclic aryl, and monocyclic aryl-lower alkyl; n is 1, 2, or 3; and X is a member selected from the group consisting of lower alkyl, lower alkoxy, and halo; and $R^1$ is a member selected from the group consisting of triphenylmethyl, diphenylmethyl, and benzyl; and recovering the products of such treatment.

2. A process in accordance with claim 1 wherein the treatment is carried out at a temperature of from about ambient to 100° C.

3. A process in accordance with claim 1 wherein the treatment is carried out in the presence of a solvent.

4. A process in accordance with claim 2 wherein the treatment is effected in the presence of potassium hydroxide, sodium hydroxide, lithium hydroxide, magnesium hydroxide, or other suitable alkaline compounds.

5. The process of claim 2 in which the treatment is effected in the presence of a buffer solution.

6. A process in accordance with claim 1 wherein the conditions of treatment comprise a pH in the range of about 6 to about 8.9, and a reaction temperature of about 50° C. to about 100° C.

7. A process in accordance with claim 1 wherein the conditions of treatment comprise a pH range of about 8.9 to about 11.5 and a reaction temperature of about 25° C. to about 50° C.

8. A process in accordance with claim 1 wherein the starting material is 3-deacetyl-7-[2-(2-thienyl)-acetamido]-cephalosporanic acid lactone.

9. The process of claim 1 wherein the starting material is 3-deacetyl-7-triphenylmethyl aminocephalosporanic acid lactone.

10. A process for preparing 3-deacetoxy-7-aminocephalosporanic acid which comprises treating a compound of the formula:

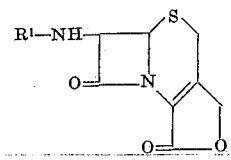

wherein $R^1$ is defined as in claim 1 with a solution having a pH of about 6 to 11.5 to form an acid having the formula:

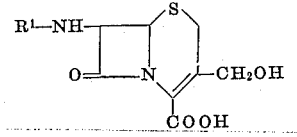

wherein $R^1$ is as defined in claim 1, reacting this acid with benzoyl chloride, recovering a compound wherein $R^1$ is benzoyl, and hydrogenating the benzoyl compound and recovering 3-deacetoxy-7-amino cephalosporanic acid.

11. A process for preparing a 7-acylamido-cephalosporanic acid which comprises reacting the acid compound of claim 10 with a compound selected from the group consisting of diazomethane and diphenyl diazomethane, recovering a compound of the formula:

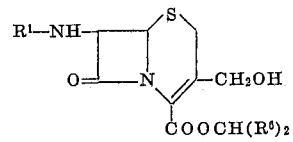

wherein $R^1$ is as defined in claim 1 and $R^6$ is hydrogen or phenyl, acylating the hydroxyl group of said compound and hydrogenolyzing the product thus formed to yield 7-acylamido cephalosporanic acid.

* * * * *

PO-1050
(5/69)

UNITED STATES PATENT OFFICE
CERTIFICATE OF CORRECTION

Patent No. 3,627,761                          Dated December 14, 1971

Inventor(s)    Saul Lewis Neidleman et al.

It is certified that error appears in the above-identified patent and that said Letters Patent are hereby corrected as shown below:

In the Abstract--that portion of the 2nd formula reading

     should read:     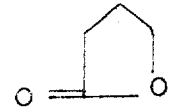

Signed and sealed this 23rd day of May 1972.

(SEAL)
Attest:

EDWARD M. FLETCHER, JR.                    ROBERT GOTTSCHALK
Attesting Officer                          Commissioner of Patents